June 10, 1969  M. C. ROY  3,448,933
APPARATUS FOR USE WITH A COMBINE TO DESTROY THE
GERMINATION OF WEED SEEDS
Filed Oct. 14, 1966
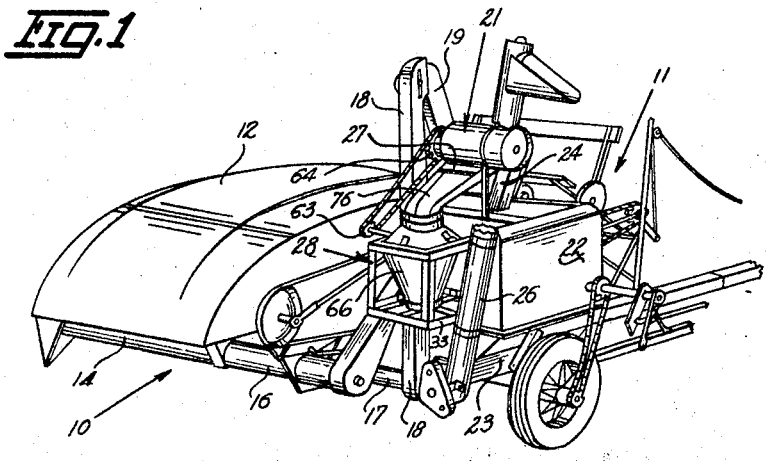
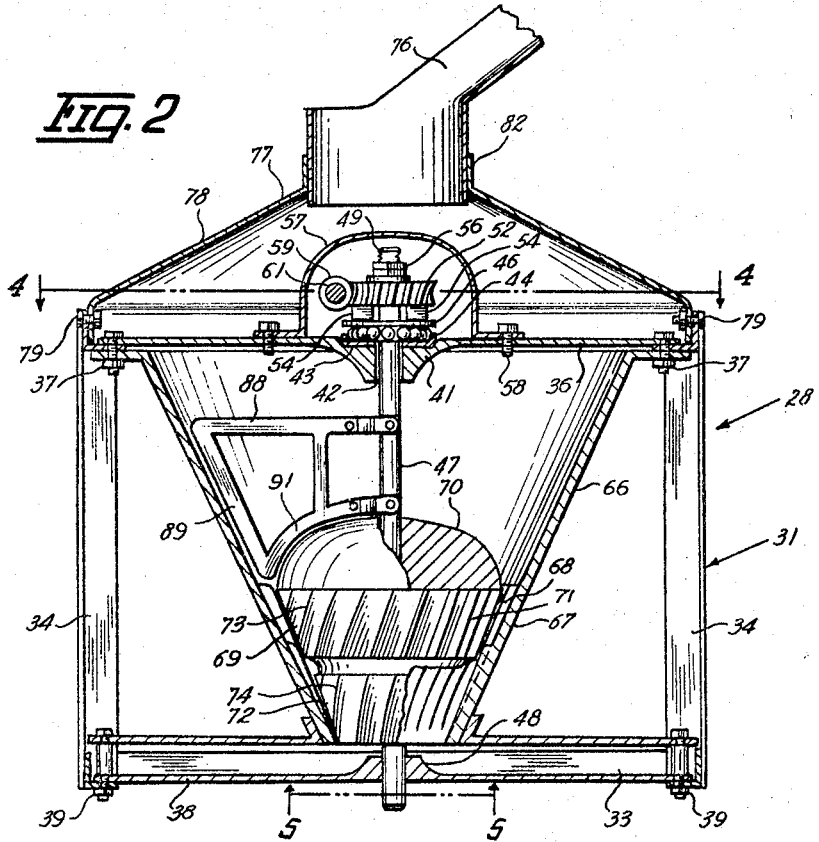
INVENTOR.
MELVIN C. ROY
BY
ATTORNEY.

June 10, 1969  M. C. ROY  3,448,933
APPARATUS FOR USE WITH A COMBINE TO DESTROY THE
GERMINATION OF WEED SEEDS
Filed Oct. 14, 1966
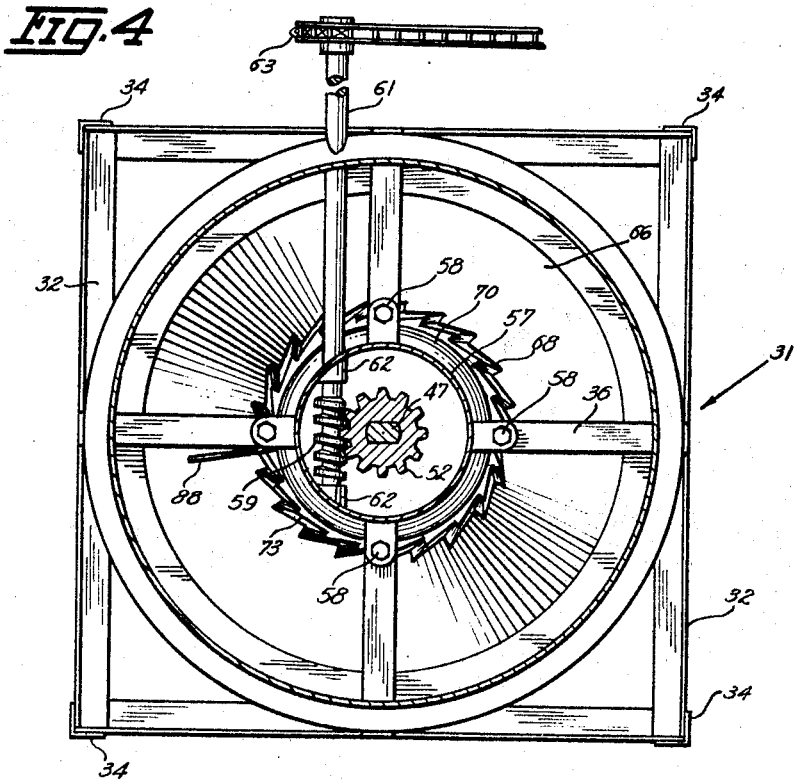
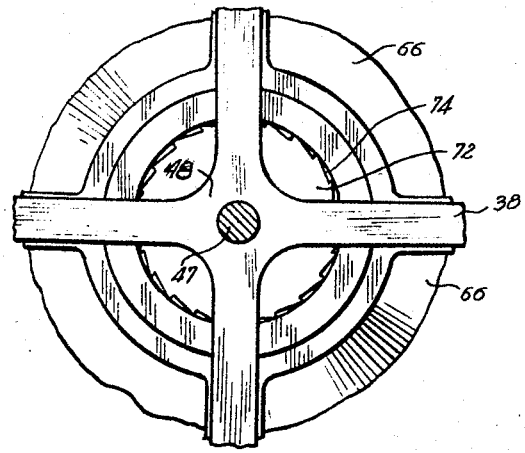
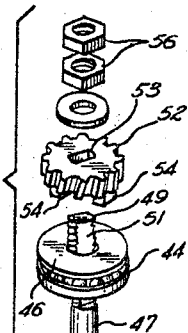
INVENTOR.
MELVIN C. ROY
BY
ATTORNEY.

United States Patent Office 3,448,933
Patented June 10, 1969

3,448,933
APPARATUS FOR USE WITH A COMBINE TO DESTROY THE GERMINATION OF WEED SEEDS
Melvin C. Roy, Clarion, Iowa, assignor of one-half to Ray V. Bailey, Clarion, Iowa
Filed Oct. 14, 1966, Ser. No. 586,727
Int. Cl. B02c 17/10, 2/10, 19/00
U.S. Cl. 241—68                     3 Claims

ABSTRACT OF THE DISCLOSURE

Following the separation of grain and weed seed in a combine operation, the separated weed seed is discharged into a removable bag container or the like, which on becoming filled is removed and the seeds emptied therefrom. By virtue of the bag container being susceptible to damage, overfilled prior to removal, or inadequately supported on the combine to receive all of the separated weed seed, some of the weed seed is permitted to fall to the ground for later germination. To eliminate such occurrence, as well as the inconvenience encountered in observing and handling the bag container, the invention provides for the separated weed seed being directly admitted into a weed seed destroying apparatus that is carried on the combine and which may consist of either a grinding apparatus, a heating apparatus or a germicide spray apparatus, that operates to totally destroy the weed seed against later germination. With the weed seed thus rendered sterile it may be continuously discharged from the apparatus to the ground from which grain has been previously harvested.

---

This invention relates generally to combine machines which both harvest and thresh grain and in particular to apparatus for use with a combine to destroy the germination of weed seeds after they have been separated from the threshed grain mass.

In the combining of grain the threshed grain mass, which along with the grain also includes weed seed, is fed into a separator mechanism for separating the grain mass from the chaff or refuse material which includes straw, husks, fine dust, tailings and the like. Included in the grain mass thus separated are the weed seeds which, if not removed from the grain mass, are delivered with the grain into a receiving bin or hopper carried on the combine. When the grain mass is to be used for feed the weed seeds remain intact and on return to the ground as part of livestock manure will germinate and grow. When the grain mass is to be used for seeding any weed seeds therein will also germinate and grow. In the event the grain is sold, rather than fed or sown by the harvester thereof, a dockage or reduced price is imposed in accordance with the quantity of weed seeds in the grain mass.

In an attempt to overcome this seeding of weed seeds and/or dockage loss it is now common practice to equip a combine with a weed seed separator attachment such as the commercially available "Scour Kleen." This type weed seed separator is usually mounted on the grain mass hopper or bin of the combine in a position to receive the grain mass directly from the threshing mechanism of the combine and functions to separate the grain from the weed seed. The separated grain is discharged from a first outlet on the weed seed separator attachment into the hopper and the separated weed seed from the second outlet on the separator attachment is discharged at a position to the outside of the hopper. The weed seed thus discharged is collected in a bag container for later destruction.

Since the bag container is usually carried on a combine at a position adjacent to the rear end of the combine its filled condition is not readily observable by the combine operator who is usually seated on the pulling tractor for a pull-type combine or at a top front position on a self-propelled combine. As a result the filled condition of the bag container is frequently overlooked by the operator and the excess weed seed is permitted to drop directly to the ground surface for later germination.

Where the bag container is under careful surveillance by the operator, the combining operation must be frequently interrupted to permit removal, emptying and replacement of the bag. This chore is both inconvenient and time consuming, especially since the collection station for the weed seed may oftentimes be an appreciable distance from the operating area of the combine.

Even when the weed seed is thus collected it must be carefully protected against being spilled or wind-blown and must be later handled for destruction by burning or the like. It is also apparent that unless the neck of the bag, when carried on the combine, is closed with the weed seed outlet of the weed seed separator attachment that portions of the weed seed will find their way to the ground surface as a result of wind action and/or travel of the combine over an inclined or rough ground surface. Additionally when a bag container is torn or pierced seed leakage takes place.

It is an object of this invention therefore to provide on a combine including a mechanism for separating weed seed from the grain mass, an apparatus for acting on the weed seed discharged directly from the separating mechanism to destroy the germination thereof after which the destroyed seed or residue is permitted to fall to the ground.

A further object of this invention is to provide in combination with a combine having a weed seed separating mechanism, an apparatus for continuously receiving weed seed from the mechanism, and fracturing or crushing the weed seed to destroy its germination, after which the crushed weed seed is discharged to the ground surface from which grain has been previously harvested.

Still another object of this invention is to provide for a combine equipped with a weed seed separating mechanism, an apparatus capable of continuously destroying the germination cell of weed seeds supplied thereto from the separating mechanism and discharging the destroyed weed seed in a trailing relation with the combine so as to eliminate any handling of or attention to the weed seed during or after a combining operation, while reducing soil contamination resulting from the use of herbicides in preventing weed growth.

Further objects, features and advantages of this invention will become apparent from the following description when taken in connection with the accompanying drawing, in which:

FIG. 1 is a rear perspective view of a combine machine shown in assembly relation with a weed seed separating attachment and weed seed destroying apparatus of this invention;

FIG. 2 is an enlarged vertical longitudinal sectional view of the weed seed destroying apparatus shown in FIG. 1;

FIG. 3 is an exploded perspective view of a gear and shaft assembly shown in FIG. 2; and FIGS. 4 and 5 are enlarged sectional views taken on the lines 4—4 and 5—5, respectively, in FIG. 2.

Referring to the drawings the combine machine, indicated as 10 in FIG. 1, is of a generally common tractor pulled type having a reel and sickle assembly 11 for harvesting grain and directing the cut grain into a threshing mechanism (not shown) enclosed within a housing 12. From the threshing mechanism the grain and chaff are delivered to a separating mechanism (not shown) and also enclosed within the housing 12, with the chaff being discharged from the separating mechanism rearwardly of the combine machine from a transversely extended outlet 14. Grain tailings are collected in an auger assembly 16 and returned to the threshing mechanism to be re-threshed by an elevator 17.

The separated grain mass, which includes grain and weed seed, is directed from the combine separating mechanism through an elevator 18 to the inlet 19 of a weed seed separating attachment 21 which is mounted on a grain bin or hopper 22 supported on the combine frame 23. The separating attachment 21 functions to separate weed seed from the grain mass supplied thereto at the inlet 19.

Grain separated from the grain mass is discharged from a first outlet 24 on the attachment 21 into the hopper 22 which has an unloading elevator 26 for loading the grain into a wagon when the hopper 22 becomes filled. A second outlet 27 on the attachment 21 delivers the separated weed seed to a position rearwardly of the hopper 22 from where the weed seed is usually collected into a bag or the like (not shown) detachably carried on the rear wall of the hopper 22.

The combine machine 10 and the operative association therewith of the weed seed separating attachment 21 as described above are in general use. However, and as previously explained this combination of the attachment 21 with the combine 10 does not provide for a positive elimination of the fertile weed seeds from returning to the ground surface or for their destruction against later germination.

To overcome these objections this invention provides for the use with the combine 10 and attachment 21 of a weed seed destroying apparatus indicated generally at 28 and illustrated as a seed crushing and grinding unit which is mounted on the combine frame 23 rearwardly of the grain hopper 22. It has been found that by breaking or fracturing the germ cell of a weed seed that the germination of the seed is efficiently destroyed so that the ground or pulverized weed seed, even when returned to the ground which grain has previously been harvested, remains sterile.

The grinding unit 28 (FIGS. 1 and 2) includes an open frame 31 of a generally cube shape and of an angle iron construction comprising a square shaped upper frame section 32 and a lower square shaped frame section 33. The corresponding corners of the frame sections 32 and 33 are connected together by upright frame members 34.

An upper supporting member 36 (FIGS. 2 and 4) of a cross shape in plan view is positioned within the plane of and is secured to the upper frame section 32 as by bolt assemblies 37. A lower support member 38 (FIGS. 2 and 5) of a cross shape in plan view extends across and is secured to the lower frame section 33 by bolts assemblies 39. The central portion of the upper support member 36 (FIG. 2) is integrally formed with a hub section 41 having a bore 42 the top end of which terminates in an enlarged recess 43 to a provide a seat for a ball bearing assembly 44 having a bearing supported retaining washer 46.

A shaft 47 is extended vertically through the bearing assembly 44 and hub section 41 with its bottom end projected through a central hub bearing 48 on the lower frame section 33 and its top end 49 projected upwardly from the bearing assembly 44. The shaft upper end 49 (FIG. 3) is externally threaded and formed with diametrically opposite flat sides 51 so as to be of a substantially rectangular shape in transverse section.

A worm gear 52 (FIGS. 3 and 4) has a central opening 53 of a rectangular shape and a pair of diametrically opposite depending bearings legs 54. The gear 52, when mounted on the upper end 49 of the shaft 47, is thus locked for rotation with the shaft with the bearing legs 54 thereof in resting engagement on the top surface of the retaining washer 46. For a puropse to appear later a locking nut assembly 56, threadable about the upper end 49 of the shaft 47, provides for a vertical adjustment of the shaft in a supported position on the bearing assembly 44 through the depending bearing legs 54.

A housing 57 (FIG. 2) of a generally dome shape for enclosing the worm gear 52 and bearing assembly 44 is secured to the upper frame section 32 by cap screws 58. A worm 59 for driving the worm gear 52 is located within the housing 57 and carried on a drive shaft 61 extended transversely of the housing 57 for rotatable support in bearings 62 (FIG. 4) formed on the housing. The outer end of the drive shaft has a sprocket gear 63 (FIGS. 1 and 4) in chain connection with a sprocket gear 64 mounted on the power shaft (not shown) for the weed separating attachment 21.

Positioned within the frame 31 in a concentrically spaced relation about the shaft 47 is a casing 66 of an inverted frustum conical shape having its upper end open to the top frame section 32 and secured thereto by the bolt assemblies 37. The lower end of the casing 66 is positioned above the lower frame section 33. As shown in FIG. 2 the inner peripheral surface of the bottom end section 67 of the casing 66 is formed with spirally extended cutting teeth 68 the depth of which progressively decreases in a downward direction so that the bottom ends of the spiral teeth 68 merge into the inner peripheral surface of the casing 66.

Mounted rigidly on the shaft 47, for operative association with the spiral teeth 68 on the casing 66, is a cutting head 69 of an inverted frustum conical shape having a dome shaped top section 70 and a pair of vertically arranged cutting sections 71 and 72 to be referred to as coarse and fine cutting sections, respectively. The outer peripheral surfaces of the cutting sections 71 and 72 are formed with spirally extended cutting teeth 73 and 74, respectively, of a reversed pitch relative to the cutting teeth 68 and with the depth of the cutting teeth 74 on the fine cutting section 72 being progressively decreased in a downward direction.

Weed seed from the outlet 27 of the separating attachment 21 is conveyed through a conduit 76 (FIGS. 1 and 2) into an inlet 77 of the seed destroying apparatus 28, with such inlet being provided at the upper end of a hood member 78 the lower end of which extends about the top frame section 32 and is secured thereto by bolt assemblies 79. The inlet 77 is formed with an upstanding marginal rim 82 to receive in a slip fit the lower end of the conduit 76, it being understood that the upper end of the conduit is suitably secured in a registered relation with the outlet 27 of the attachment 21.

In the use of the weed seed destroying apparatus 28 weed seed separated by the attachment 21 is continuously introduced into the outlet 77 from the conduit 76. This weed seed falls about the housing 57 and through the top frame section 32 into the casing 66 and onto the dome shaped section 70 of the cutting head 69, from where it is directed into the zone of cutting action between the cutting head 69 and casing teeth 68. As previously explained the cutting teeth 73 and 74 on the cutting sections 71 and 72, respectively, are of a reversed pitch relative to the teeth 68 on the casing 66. The shaft 47 is rotated in the direction of the spiral of the teeth 73 and 74 and against the spiral of the teeth 68 on the casing 66 to effect a positive breaking and grinding of the weed seeds.

The weed seed is progressively acted upon as it passes downwardly of the cutting head 69 with any fine weed seed, and fractured portions of large weed seed, being finally ground to a flour fine consistency between the fine cutting section 72 and the lower portions of the teeth 68 on the casing 66. The ground weed seed is discharged from the lower end of the casing 66 and through the open lower frame section 33 directly to the ground rearwardly of the combine 10. By adjustment of the lock nut assembly 56 the shaft 47 is adjustable vertically relative to the gear 52 and bearing assembly 44 to provide for the adjustment of the cutter head 69 relative to the casing teeth 68.

It is seen, therefore, that the weed seed from the outlet 27 of the attachment 21 is completely enclosed during its travel through the conduit 76 and the grinding apparatus 28 so as to eliminate any possibility of fertile weed seed being passed to the ground without first going through the apparatus 28.

To prevent any arcing or clogging of the weed seed within the casing 66 there is secured to the shaft 47, at a position thereon between the upper frame section 32 and the cutting head 69 a radially extended agitator member 88. The member 88 has an outer portion 89 movable adjacent the inner peripheral surface of the casing 66 and a lower portion 91 movable adjacent to the surface of the dome section on the cutting head 69. As a result all weed seed above the cutting head 69 and within the casing 66 is continuously acted upon and directed into the grinding zone between the cutting head 69 and the casing 66.

The weed seed destroying apparatus 28 functions continuously during a grain harvesting operation to receive and destroy weed seed against germination and to deliver the destroyed weed seed back to the ground. Germination of the weed seed is thus completely destroyed without requiring any attention or handling by the combine operator.

Although the invention has been described and illustrated relative to a weed seed destroying apparatus consisting of a grinding unit, it is to be understood that other apparatus for mounting on the combine and operable for the same purpose may be used such as, for example, a germicide spraying apparatus or an apparatus capable of generating sufficient heat which acting on the weed seed will destroy the germination thereof.

I claim:

1. For use with a combine machine including a grain mass and chaff separating mechanism having a grain mass discharge portion, a grain receiving bin and a mechanism for separating weed seed from the grain mass having an inlet for receiving the grain mass from said discharge portion, a first outlet for delivering the separated grain to said bin and a second outlet for delivering the separated weed seed to a position outside of said bin:
   (a) means for acting on said weed seeds to destroy the germination thereof mounted on said machine, and
   (b) means for directing the weed seed from said second outlet for passage through said germination destroying means to the ground surface.

2. For use with a combine machine including a grain mass and chaff separating mechanism having a grain mass discharge portion, a grain receiving bin and a mechanism for separating weed seed from the grain mass having an inlet for receiving the grain mass from said discharge portion, a first outlet for delivering the separated grain to said bin and a second outlet for delivering the separated weed seed to a position outside of said bin:
   (a) means for fracturing said weed seeds to destroy the germination thereof mounted on said machine and having an inlet portion and an outlet portion, and
   (b) conduit means for said weed seed extended between and connected to said second outlet and inlet portion,
   (c) with the fractured weed seed from said outlet portion being directed to fall on the ground surface.

3. For use with a combine machine including a grain mass and chaff separating mechanism having a grain mass discharge portion, a grain receiving bin and a mechanism for separating weed seed from the grain mass having an inlet for receiving the grain mass from said discharge portion, a first outlet for delivering the separated grain to said bin and a second outlet for delivering the separated weed seed to a position outside of said bin:
   (a) a unit for grinding said weed seeds to destroy the germination thereof having an inlet portion and an outlet portion,
   (b) means for mounting said grinding unit on and adjacent the rear end of the machine with said inlet portion below the level of said second outlet, and
   (c) conduit means for carrying said weed seed extended between and connected to said second outlet and inlet portion,
   (d) with the ground weed seed from said outlet portion being directed to fall on the ground surface.

References Cited

UNITED STATES PATENTS

| 1,868,237 | 7/1932 | Judson | 130—27 X |
| 2,306,753 | 12/1942 | Ronning | 130—27 X |

HARRISON L. HINSON, *Primary Examiner.*

U.S. Cl. X.R.

130—27; 146—192